Sept. 21, 1943.   H. B. SHAPIRO   2,329,949
RHEOSTAT DEVICE
Filed Nov. 12, 1941   3 Sheets-Sheet 1
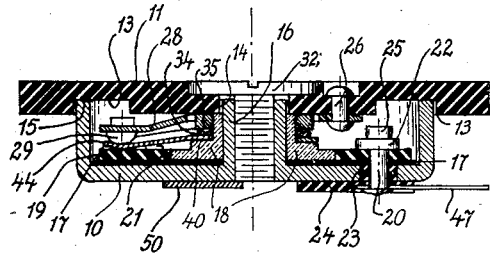
FIG.1
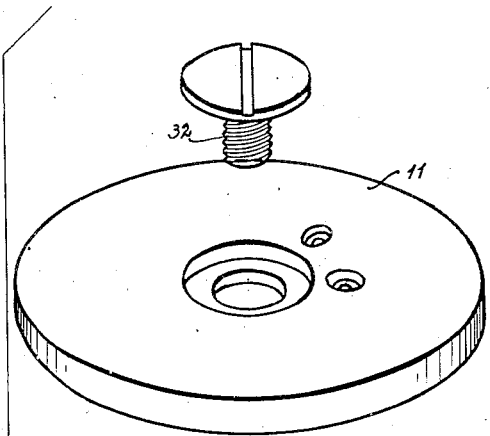
FIG.4
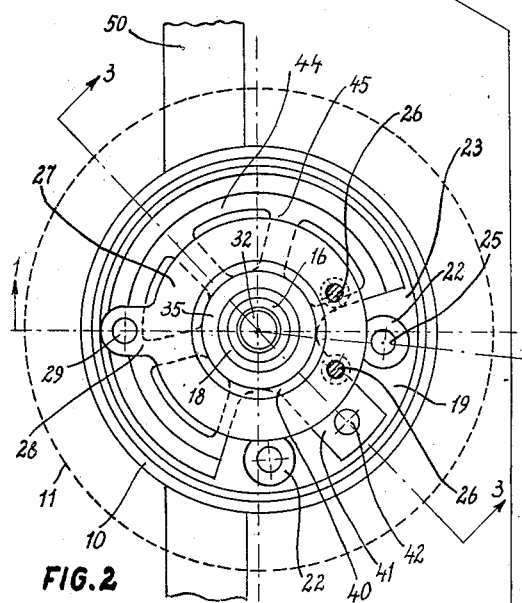
FIG.2
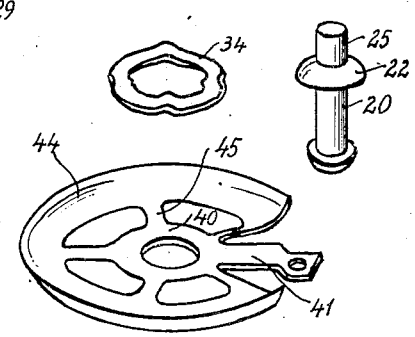
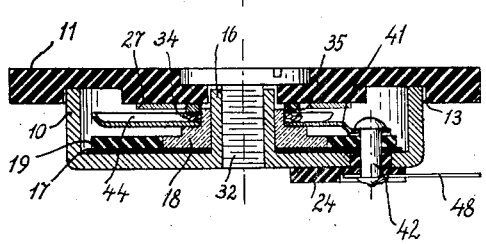
FIG.3
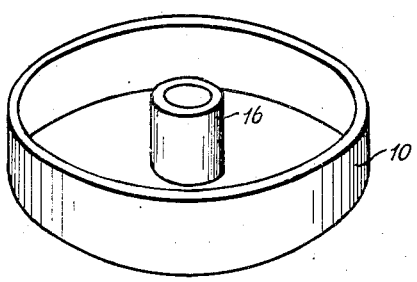
INVENTOR.
HARRY B. SHAPIRO.
BY S. Michael Pineles
ATTORNEYS.

Sept. 21, 1943. H. B. SHAPIRO 2,329,949
RHEOSTAT DEVICE
Filed Nov. 12, 1941 3 Sheets-Sheet 2
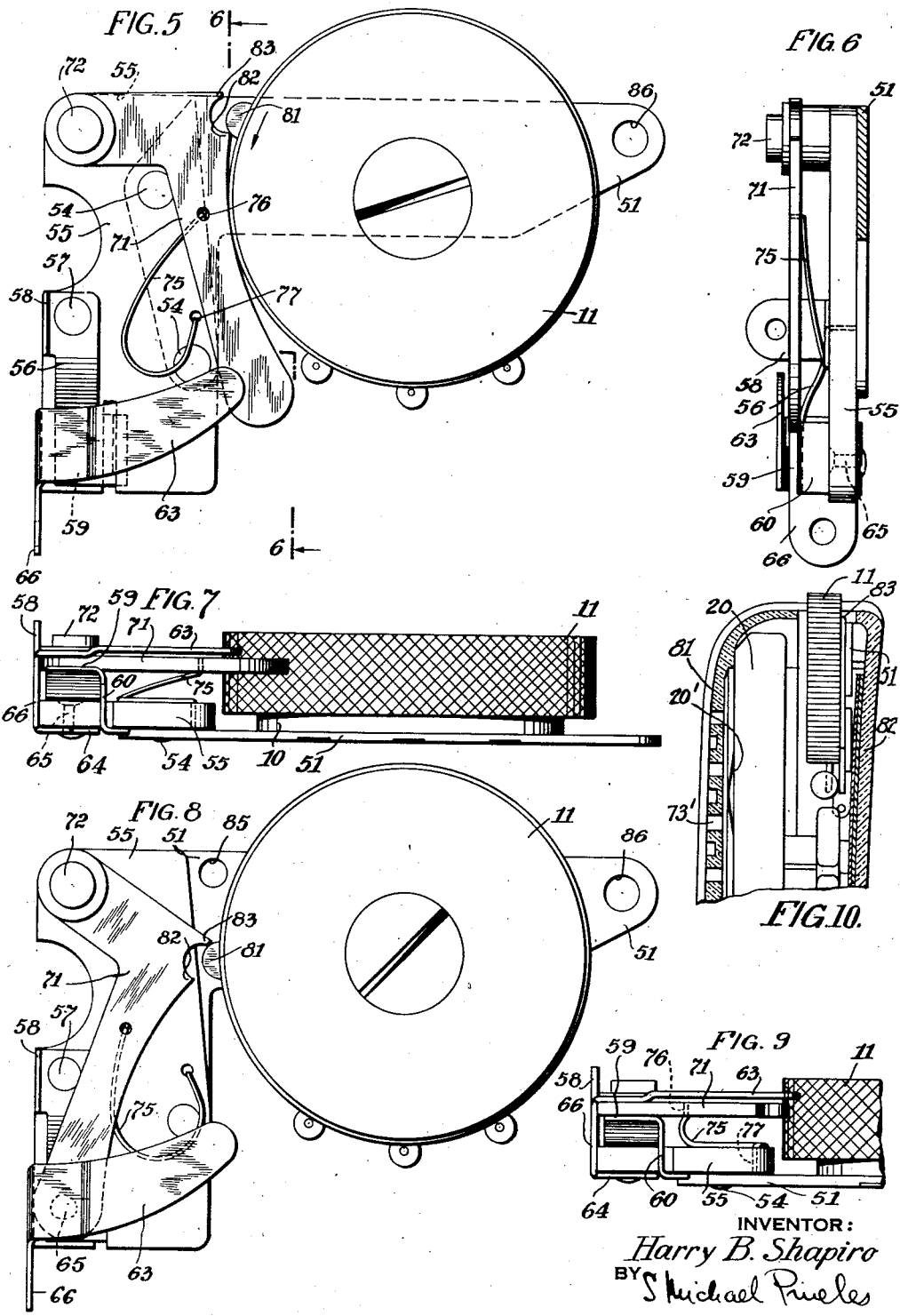
INVENTOR:
Harry B. Shapiro
BY S. Michael Prieles
ATTORNEY.

Sept. 21, 1943.   H. B. SHAPIRO   2,329,949
RHEOSTAT DEVICE
Filed Nov. 12, 1941   3 Sheets-Sheet 3
FIG.11.
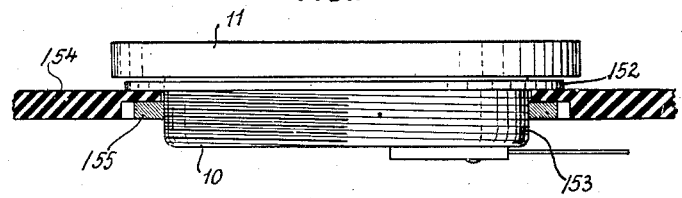
FIG.12.
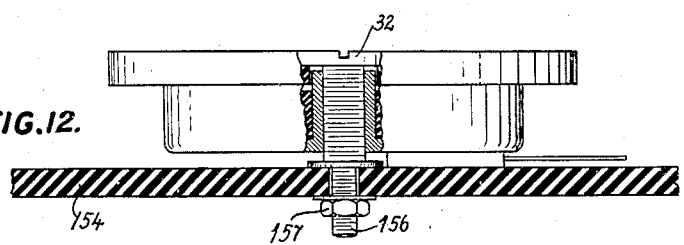
FIG.13.
INVENTOR.
HARRY B. SHAPIRO.
BY
ATTORNEYS.

Patented Sept. 21, 1943

2,329,949

UNITED STATES PATENT OFFICE 2,329,949

RHEOSTAT DEVICE

Harry B. Shapiro, Cleveland, Ohio, assignor to Sonotone Corporation, Elmsford, N. Y., a corporation of New York Application November 12, 1941, Serial No. 418,856

13 Claims. (Cl. 201—55)

This application is a continuation-in-part of the application Serial No. 303,563, filed November 9, 1939.

This invention relates to rheostat devices and more particularly to rheostat or potentiometer devices of the type generally used in radio receivers or the like.

Among the objects of the invention is a novel rheostat device of the foregoing type which is composed of a lesser number of parts, occupies much less space than the best prior art devices of this type, and has various other advantages thereover.

A distinct phase of the invention is a combination of such rheostat with circuit switching means which are abruptly actuated between a circuit opening and a circuit closing position incidental to the actuation of the rheostat in response to an adjustment of the rheostat to a certain operating position.

The foregoing and other objects of the invention will be best understood from the following description of exemplifications thereof, reference being had to the accompanying drawings wherein Fig. 1 is a cross-sectional view of a rheostat device exemplifying the invention along line 1—1 of Fig. 2;

Fig. 2 is a top view of the casing portion of the device with the elements mounted therein;

Fig. 3 is a view similar to Fig. 1 along line 3—3 of Fig. 2;

Fig. 4 is an exploded perspective view of the device, some of its parts being omitted;

Fig. 5 is a top view illustrating a combination rheostat and switching device of the invention utilizing a rheostat device of the type shown in Figs. 1 to 3;

Fig. 6 is a view along line 6—6 of Fig. 5;

Fig. 7 is a view along line 7—7 of Fig. 5;

Fig. 8 is a view similar to Fig. 5 showing the switch in the closed position just as it is about to be opened by a further clockwise turn of the rheostat wall grip member;

Fig. 9 is a view similar to Fig. 7 with the switch blade in the closed position;

Fig. 10 is a front elevational view illustrating the mounting of the rheostat and switching unit shown in Figs. 5 to 9; and Figs. 11 to 13 are side elevational views illustrating different ways of mounting the rheostat device.

The rheostat device of Figs. 1 to 4 exemplifying the invention was invented for use as a part of a wearable electron-tube hearing-aid amplifier unit having overall dimensions of only about 5 x 2½ x ⅞ inches, small enough to fit into a vest pocket of a person, such as described in my copending application Serial No. 418,857, filed November 12, 1941, as a continuation-in-part of my application Serial No. 294,649, filed September 13, 1939.

Referring to Figs. 1 to 4, the rheostat exemplifying the invention has the form of an extremely flat tiny structure composed of two facing wall members forming a circular casing 16 and a cover wall 11 which are revolvably joined to each other. The casing 10 in which all the operating parts are housed has an outer diameter of only .750 inch and its overall height is only .145 inch. In the form here shown, the casing 10, which serves as the supporting wall member, is made of metal and the cover 11, which serves as the rotary wall member, is made of insulating material, such as a synthetic resin. The cooperating facing surfaces of the casing 10 and the cover 11 are designed to interfit and prevent dust, dirt or other foreign matter from entering into the interior of the casing, while permitting revolvable motion between the casing and the cover. In the form here shown, this is accomplished by providing the cover 11 with a circular groove 13 and a central hole 14 overlapping and fitting over the circular rim 15 and the central re-entrant cylindrical bushing portion 16 of the casing which bound the annular casing space from which foreign matter must be kept away.

The metallic bottom wall of the casing 10 is covered by a thin insulating washer 17, of paper, for instance. A shoulder-bushing 18 of insulating material is placed around the re-entrant bushing 16 of the casing above the insulating washer 17. Around the lower flange of the shoulder-bushing 18, above the underlying periphery of the insulating washer 17, is mounted a flat ring-shaped resistance element 19 having a substantially rigid body of insulating material, such as a synthetic resin, which is affixed to the bottom wall of the casing 10 by means of two rivets 20 extending through holes of the casing 10 and clamped thereto. Although wire-wound resistance elements may be used in the unit here shown, the long arcuate portion of the ring-like resistance element 19 extending between the two rivets 20 is coated with a resistance film 21 and each rivet 20 has a rivet head 22 which makes a good electric contact with the underlying end portions of the arcuate resistance film 21 so as to form an external terminal connection thereto. Insulating bushings 23 and an insulating strip 24 insulate the rivets 20 from the casing 10 and each rivet head 22 has an upwardly projecting stop pin 25. The resistance element 19 is thus firmly held in place around the flange of the central bushing 18 within the casing by the rivets 20, which also serve as terminals for its resistance film 21.

To the underside of the central portion of the cover 11 is clamped, as by means of two rivets 26, a resiliently pressing slider arm 28 provided with a stud-like contact member 29 mounted in a hole of the arm 28 and having a rounded surface which is pressed by the slider arm 28 against the resistance film 21 of the resistance element 19 while it is moved over its arcuate surface between the stop pins 25 of its two rivet terminals 20.

The cover 11 with its slider arm 28 is revolvably joined to the casing 10, as by a screw 32 engaging the inner threaded surface of the central bushing 16 of the casing 10, the flat head of the screw 32 fitting flush a suitable depression in the outer surface of the cover 11. A spring washer 34 provided with bent springy ripple portions and a spacer washer 35 are mounted between the shoulder of the bushing 18 and the overlying portion of the cover 11 to hold the cover in its revolvable operating position shown in Figs. 1 to 3. Interposed between the spring washer 35 and the underlying portion of the shoulder-bushing 18 is a circular contact plate 40 having a terminal arm 41 overlying the uncoated portion of the resistance element 19, extending between its two terminal rivets 20, and a similar rivet 42 insulatingly mounted within a hole of the casing 10 clamps the contact plate arm to the casing and provides an insulated external terminal connection to the movable contact member of the rheostat.

A rheostat or potentiometer constructed in the way described above may be designed to have its contact member 29 in direct sliding contact engagement with the resistance film 21 for varying the resistance by moving the contact member to different arcuate portions of the resistance film 21. In the form shown in the drawings, the contact plate 40 is formed of a plurality of spokes carrying a flexible contact rim 44 overlying the arcuate resistance film 21 and held biased at a gap distance away from the film 21 so that the sliding motion of the contact member 29 presses successive portions of the flexible rim into contact engagement with different points along the arcuate resistance film 21. The contact rim 44 of the contact plate 40 has its outer edge stiffened by curving it into convex shape in the way shown in Figs. 3 and 4. The spokes and the rim 44 of the contact plate 40 are designed to have a total stiffness which is sufficient to keep the rim biased away from its engagement with the resistance film 21, and the edge of the contact rim 44 is sufficiently stiffened by the curved convex edge portion so that substantially the entire periphery of the rim exerts substantially the same restoring forces which oppose its being bent by the sliding contact member 29 into engagement with the resistance film 21 when the contact member 29 is moved along the rim. With such arrangement, the rim portion 44 of the contact plate 40 is used to make variable contact with different portions of the resistance film 21, and the movable contact member 29, which is used only to press different peripheral portions of the contact plate portion into engagement with the resistance film, may be made of insulating material.

Underneath the outer rivet heads of the terminal rivets 20 and 42 may be clamped suitable terminal strips 47, 48 for making connections to external circuits.

In the rheostat unit described above, the two relatively movable rheostat elements are carried by two relatively movable wall members of the casing which encloses all operating elements of the rheostat and protects them against contamination by dust, and other foreign matter. The central wall portions of the rheostat casing are designed to form the revolvable junction which keeps the relatively movable rheostat elements in their proper operating positions. This arrangement makes it possible to provide a rheostat with a relatively great variable resistance range within an extremely small unit having a casing of an outside diameter of about .750 inch or less, and an overall height of only about .2 inch or less.

To operate the rheostat, it is merely necessary to touch the periphery of the cover 11 which serves as a grip and move it to different angular positions. The cover rotates the contact arm 28 to the desired angular position, in which the contact arm 28 with its contact member 29 presses the underlying portion of the rim of the contact plate 40 into engagement with the desired point portion of the arcuate resistance film 21. This establishes a connection between the terminal rivet 42, which is connected to the contact plate 40, and the desired point of the resistance film 21 which is connected by means of its terminal rivets 20 to the associated operating circuits.

In the rheostat or volume control potentiometer device described above, the casing 10 and the cover 11 form thus two relatively movable substantially parallel wall members having overlapping portions confining a substantially circular interior space in which the rheostat elements are housed. One of the two parallel wall members, namely the casing 10, carries one of the rheostat elements, namely the resistor element ring 19, provided with an elongated arcuate resistance film coating 21 and held in fixed position on the casing by the rivets 20 which serve also as external terminal connections to the ends of the resistance film 21. The cooperating rheostat element which serves as contact means for establishing an electric contact connection with consecutive portions of the resistance film 21 is formed by the contact rim 44 and the contact arm 28 with its contact projection 29 which are carried by the other wall member of the casing, namely, the cover 11, and rotated thereby so as to press consecutive peripheral portions of the contact rim 44 into electrical contact engagement with the selected portions of the resistance film 21. The two relatively movable parallel wall members confine the two cooperating rheostat elements in the space inclosed by the wall members and the two wall members are revolvably joined so that by rotating one wall member relatively to the other the movable contact member is electrically connected to different consecutive portions of the resistance film 21. This arrangement makes it possible to construct a compact fully protected rheostat or potentiometer device in the form of an extremely flat casing, and to utilize a laterally projecting rim portion of one of the wall members, which does not occupy any additional height, for actuating the rheostat device to different points of its operating range.

Such rheostat unit may be mounted in its operating position in a variety of ways. Thus, when used as a volume control of a flat wearable electron tube amplifier fitting a pocket of the user, it may be provided with a supporting strip 50 of metal, extending from, or suitably secured, as by spot welding, to the bottom wall of the casing 10, for mounting the resistance unit in its location.

As explained above, the rheostat device of the invention was evolved in connection with the development of a vacuum tube hearing aid. In such hearing aids, it is of utmost importance to reduce to a minimum the number of controls which have to be operated by the user in order to adjust the sound output of the hearing aid and effect energization or deenergization of the hearing aid.

One phase of the present invention resides in the combination of a rheostat device of the type described in connection with Figs. 1 to 3, with foolproof reliable circuit switching means which are actuated abruptly between a circuit closing and circuit opening position upon the actuation of the rheostat to or from a predetermined operating position. Such combined rheostat and switching device exemplifying one form of the invention is shown in Figs. 5 to 9.

To a supporting element 51 extending from one of the walls of a rheostat device similar to that of Figs. 1 to 3, in the present case in the form of a strip secured, as by spot welding, to the bottom wall 10 of the rheostat device, is secured, as by rivets 54, an insulating strip 55 serving as a mounting plate for two switch contact elements 56 and 63, respectively, each made of a conducting resilient sheet metal strip.

Contact element 56 is made of a strip having one end affixed to the insulating mounting plate 55 by a rivet 57 and provided with a laterally bent terminal extension 58, the other freely projecting end of the strip having an upwardly facing contact surface 59 and being provided with a laterally bent guide extension 60 interfitting within a groove of the insulating mounting plate 55 so as to be guided therein when it is flexed.

The other contact element 63 has a folded-over mounting end 64 affixed to the underside of the insulating mounting strip 55 as by a rivet 65 so as to hold the freely projecting upper main portion of the contact strip 63 in a freely projecting position transverse to the general direction of the contact strip over the underlying contact surface 59 of the other contact strip 56, an intermediate portion of the contact strip 56 being provided with a terminal projection 66.

A contact blade 71 made of a relatively rigid metallic sheet member has one end pivotally held on a pivot pin member 72, one end of which is secured, as by riveting, to the insulating mounting plate 55, so that the free end of the contact blade 71 may be tilted between the full-line position shown in Fig. 5, where its free end extends underneath the free end of the contact strip 63, and the closed position in which the end of the contact blade 71 enters and makes contact with the contact surface portion 59 of the contact strip 56 and the facing contact surface portion of the contact member 63.

A spring element 75 bent in a plane parallel to the plane of motion of the blade member has one laterally bent arm 76 interfitting a hole in the blade member, and an oppositely bent lateral arm 77 interfitting a hole in the mounting member 55, the mounting holes of the spring 75 being arranged to cause the spring to swing the blade 71 either to the full-line open position, or to the dotted-line closed position once the spring arm 76 has moved past the center position determined by the pivot pin 72 and the spring arm 77.

The movable contact wall 11 of the rheostat device, which is utilized to adjust the rheostat, and the contact blade 71 of the switch means are provided with cooperating elements designed so that with the switch blade 71 in its open position, the initial part of the motion imparted to the rheostat adjusting member 11 from a predetermined adjusted portion will actuate the contact blade 71 past its over-center position and cause it to snap to the circuit closing position, whereupon the rheostat adjusting wall member 11 is free for movement to all positions over the adjustable rheostat range, while the contact blade 71 remains stationary and unaffected in its closed position, and to bring about engagement of a portion of the wall member 11 with a portion of the switch blade 71 while it is in the closed position to cause it to be returned with the snap action to the open position when the rheostat adjusting member 11 reaches the end of its adjusting movement from which it has been actuated to start the rheostat adjusting motion previously described.

In the form shown, the rheostat adjusting wall member 11 is provided with a nose projection 81 arranged so as to cooperate with a cam surface projection 82 of the blade member and actuate it from the open position to the closed position when the rheostat adjusting member 11 is started on its adjusting motion, and to cause the rheostat projection 81 to engage the cam surface projection 83 of the blade arm during the last portion of the returning motion of the rheostat and bring about the actuation of the blade member from the closed to the open position.

Fig. 10 shows how the rheostat switch unit described above in connection with Figs. 5 to 9 is mounted within a border portion of a flat small housing 81 of a wearable vacuum tube hearing aid amplifier constituting the subject matter of my copending application Serial No. 418,857 referred to hereinabove. The housing 81 has a rear wall 82 against which the mounting strip 51 of the rheostat switch combination is suitably clamped, as by screws, so that the portion of the circular periphery of the rotatable rheostat member 11 projects through a slit 83 of the housing for enabling ready actuation of the rheostat and the switch by placing the finger against the border portion of the housing.

Rheostats of the invention, such as described above, may be mounted in its operating position in a variety of other ways.

Thus, as shown in Fig. 11, the cylindrical exterior of the casing portion of the rheostat device may be provided with a flange 152 and a threaded cylindrical surface 153 for mounting it in an opening of a supporting plate 154 by means of a nut ring 155 screwed on the threaded surface of the casing. Alternatively, as shown in Fig. 12, the shank of the junction screw 32 of the rheostat may be provided with a threaded extension 156 which is clamped within a hole of a supporting wall 154 by a nut 157.

If such rheostat unit is to be mounted behind a panel for actuation by a shaft extending through a hole in the panel, in the way rheostats are usually mounted in standard radio receivers, it may be combined with a mounting bracket arranged in the way shown in Fig. 13. The mounting bracket comprises a rectangular clamp 160 formed of a suitably bent strip of metal having at its center a threaded hole engaging an externally threaded mounting nipple 161 which fits a hole of a panel 154 and is clamped thereto by a nut 162.

A rheostat unit, such as shown in Figs. 1 to 4, having a casing 10 and a cover 11 of a diameter substantially equal to the diameter of the casing is placed within the rectangular space of the clamp 160 and held against the inwardly bent rear ends 164 of the clamp by a stub shaft 165 extending through the nipple 161. The inner end of the stub shaft 165 has a key stud fitting a key hole of a key arm 167 provided with two catch lugs 168 interlockingly engaging suitable depressions in the cover 11 so that by rotating the shaft 165, the cover 11 is rotated relatively to the casing 10 to actuate the rheostat. A spring washer 169 having inwardly projecting catch lugs 170 is sprung into a groove 171 of the stub shaft 165 and supplies the biasing pressure which holds the casing clamped against the inwardly bent ends 164 of the clamp. The portion of the casing engaged by the clamp ends 164 may be provided with outwardly bent projections 173 on the opposite sides of each clamp end 164 so as to prevent rotation of the casing when its cover 11 is rotated by the stub shaft 165 for actuating the rheostat device.

A rheostat and mounting clamp arranged in the way shown in Fig. 13 do not occupy more space than the known panel-type midget radio-receiver rheostats, and has very distinct advantages thereover because it may be quickly removed from its mounting position and replaced by exerting slight pressure on the spring washer 169.

It will be apparent to those skilled in the art that the principles of the invention disclosed herein in connection with specific exemplifications of the invention will suggest various other applications and modifications thereof. It is accordingly desired that in construing the breadth of the appended claims they shall not be limited to the specific exemplifications of the invention described herein.

I claim:

1. In a rheostat device: a rotary wall member and a cooperating supporting wall member having generally parallel exterior wall surfaces forming outer boundaries of said device and interfitting facing border portions confining an interior space; one of said wall members having a circular border portion; a substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element acting as a journaling support with respect to forces exerted in directions generally parallel to the axis of said rotary movement; the overall distance between the exterior generally parallel surfaces of said wall members being less than about half the diameter of said circular border portion; said rotary wall member having a peripheral grip portion extending beyond the lateral boundary of the supporting wall member.

2. In a rheostat device forming part of an instrument having a flat housing small enough for comfortable wear on the body of a person: a rotary wall member and a cooperating supporting wall member having generally parallel exterior wall surfaces forming outer boundaries of said device and interfitting facing border portions confining an interior space; one of said wall members having a circular border portion; a substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element acting as a journaling support with respect to forces exerted in directions generally parallel to the axis of said rotary movement; the overall distance between the exterior generally parallel surfaces of said wall members being less than about half the diameter of said circular border portion; said supporting wall member being arranged for mounting on an interior surface portion of said housing and said rotary wall member having a peripheral grip portion extending beyond the lateral boundary of the supporting wall member and arranged for gripping through an opening in said housing.

3. In a rheostat device: a rotary wall member and a cooperating supporting wall member having generally parallel exterior wall surfaces forming outer boundaries of said device and interfitting facing border portions confining an interior space; one of said wall members having a circular border portion; an arcuate substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element acting as a journaling support with respect to forces exerted in directions generally parallel to the axis of said rotary movement; the overall distance between the exterior generally parallel surfaces of said wall members being less than about half the diameter of said circular border portion.

4. In a rheostat device: a rotary wall member and a cooperating supporting wall member having generally parallel exterior wall surfaces forming outer boundaries of said device and interfitting facing border portions confining an interior space; one of said wall members having a circular border portion; an arcuate substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element and surface portions of said circular border portion acting as journaling supports with respect to forces exerted in directions generally parallel to the axis of said rotary movement; the overall distance between the exterior generally parallel surfaces of said wall members being less than about half the diameter of said circular border portion.

5. In a rheostat device: a rotary wall member and a cooperating supporting wall member having generally parallel exterior wall surfaces forming outer boundaries of said device and interfitting facing border portions confining an interior space; an arcuate substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having a circular border portion and one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatively joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element and surface portions of said circular border portion acting as journaling supports with respect to forces exerted in directions generally parallel to the axis of said rotary movement; the overall distance between the exterior generally parallel surfaces of said wall members being less than about half the diameter of said circular border portion.

6. In a rheostat device: a rotary wall member and a cooperating supporting wall member having generally parallel exterior wall surfaces forming outer boundaries of said device and interfitting facing border portions confining an interior space; one of said wall members having a circular border portion; an arcuate substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element acting as a journaling support with respect to forces exerted in directions generally parallel to the axis of said rotary movement; the overall distance between the exterior generally parallel surfaces of said wall members being less than about half the diameter of said circular border portion; surface portions of one of said junction elements and surface portions of one of said wall members acting as journaling supports with respect to forces exerted in directions generally perpendicular to the axis of said rotary movement.

7. In a rheostat device: a rotary wall member and a cooperating supporting wall member having generally parallel exterior wall surfaces forming outer boundaries of said device and interfitting facing border portions confining an interior space; one of said wall members having a circular border portion; an arcuate substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element and surface portions of said circular border portion acting as journaling supports with respect to forces exerted in directions generally parallel to the axis of said rotary movement; the overall distance between the exterior generally parallel surfaces of said wall members being less than about half the diameter of said circular border portion; surface portions of one of said junction elements and surface portions of one of said wall members acting as journaling supports with respect to forces exerted in directions generally perpendicular to the axis of said rotary movement.

8. In a rheostat device: a rotary wall member and a cooperating supporting wall member having generally parallel exterior wall surfaces forming outer boundaries of said device and interfitting facing border portions confining an interior space; an arcuate substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having a circular border portion and one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element and surface portions of said circular border portion acting as journaling supports with respect to forces exerted in directions generally parallel to the axis of said rotary movement; the overall distance between the exterior generally parallel surfaces of said wall members being less than about half the diameter of said circular border portion; surface portions of one of said junction elements and surface portions of one of said wall members acting as journaling supports with respect to forces exerted in directions generally perpendicular to the axis of said rotary movement.

9. In a rheostat device forming part of an instrument having a flat housing small enough for comfortable wear on the body of a person: a rotary wall member and a cooperating supporting wall member having generally parallel exterior wall surfaces forming outer boundaries of said device and interfitting facing border portions confining an interior space; one of said wall members having a circular border portion; a substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element and surface portions of said circular border portion acting as journaling supports with respect to forces exerted in directions generally parallel to the axis of said rotary movement; the overall distance between the exterior generally parallel surfaces of said wall members being less than about half the diameter of said circular border portion; said supporting wall member being arranged for mounting on an interior surface portion of said housing and said rotary wall member having a peripheral grip portion extending beyond the lateral boundary of the supporting wall member and arranged for gripping through an opening in said housing.

10. In a rheostat device forming part of an instrument having a flat housing small enough for comfortable wear on the body of a person: a rotary wall member and a cooperating supporting wall member having generally parallel exterior wall surfaces forming outer boundaries of said device and interfitting facing border portions confining an interior space; a substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having a circular border portion and one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; said inwardly facing surface portions of said other junction element and surface portions of said circular border portion acting as journaling supports with respect to forces exerted in directions generally parallel to the axis of said rotary movement; the overall distance between the exterior generally parallel surfaces of said wall members being less than about half the diameter of said circular border portion; said supporting wall member being arranged for mounting on an interior surface portion of said housing and said rotary wall member having a peripheral grip portion extending beyond the lateral boundary of the supporting wall member and arranged for gripping through an opening in said housing.

11. In a rheostat device: a rotary wall member and a cooperating supporting wall member having generally parallel exterior wall surfaces forming outer boundaries of said device and interfitting facing border portions confining an interior space; a substantially flat resistance element extending in a plane generally parallel to said exterior wall surfaces and connected to one of said wall members in said interior space; contact means including a slider member connected to the other wall member for establishing electrical contact engagement with different peripheral portions of siad resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; the overall distance between the exterior generally parallel surfaces of said wall members being less than about half the diameter of said circular border portion; said supporting wall member having a lateral wall extension; a stationary switch contact member and movable switch contact member mounted on said lateral wall extension; said movable switch contact member being interlinked with a peripheral portion of said rotary wall member and being so arranged that on moving said rotary wall member past a predetermined position said switch contact members are actuated from a closed position to an open position and that on moving said rotary member in opposite direction within the region of said predetermined position said switch contact members are actuated from the open position to the closed position.

12. In a rheostat device forming part of an instrument having a flat housing small enough for comfortable wear on the body of a person: a rotary wall member and a cooperating supporting wall member having generally parallel exterior wall surfaces forming outer boundaries of said device and interfitting facing border portions confining an interior space; a substantially flat resistance element extending in a plane generally parallel to said exterior wall surfaces and connected to one of said wall members in said interior space; contact means including a slider member connected to the other wall member for establishing electrical contact engagement with different peripheral portions of said resistance element; one of said wall members having one inwardly facing junction element provided with a hole facing said interior space; one other junction element substantially confined within the exterior wall surface of the other wall member and having inwardly facing surface portions slidably engaging portions of said other wall member and surface portions clampingly engaging the hole of said one junction element so as to hold said wall members rotatably joined and permit one wall member to be rotated relatively to the other for actuating said slider member to adjustably establish engagement of said contact means with consecutive portions of said resistance element while maintaining said resistance element and said contact means enclosed in said space; the overall distance between the exterior generally parallel surfaces of said wall members being less than about half the diameter of said circular border portion; said supporting wall member being arranged for mounting on an interior surface portion of said housing and said rotary wall member having a peripheral grip portion extending beyond the lateral boundary of the supporting wall member and arranged for gripping through an opening in said housing; said supporting wall member having a lateral wall extension; a stationary switch contact member and movable switch contact member mounted on said lateral wall extension; said movable switch contact member being interlinked with a peripheral portion of said rotary wall member and being so arranged that on moving said rotary wall member past a predetermined position said switch contact members are actuated from a closed position to an open position and that on moving said rotary member in opposite direction within the region of said predetermined position said switch contact members are actuated from the open position to the closed position; said stationary and movable switch contact members being confined to a space extending laterally from the space confined between the exterior boundaries of said rheostat device.

13. In a rheostat device as defined by claim 12, characterized by the fact that the switch contact members operate abruptly.

HARRY B. SHAPIRO.